Figure 1:
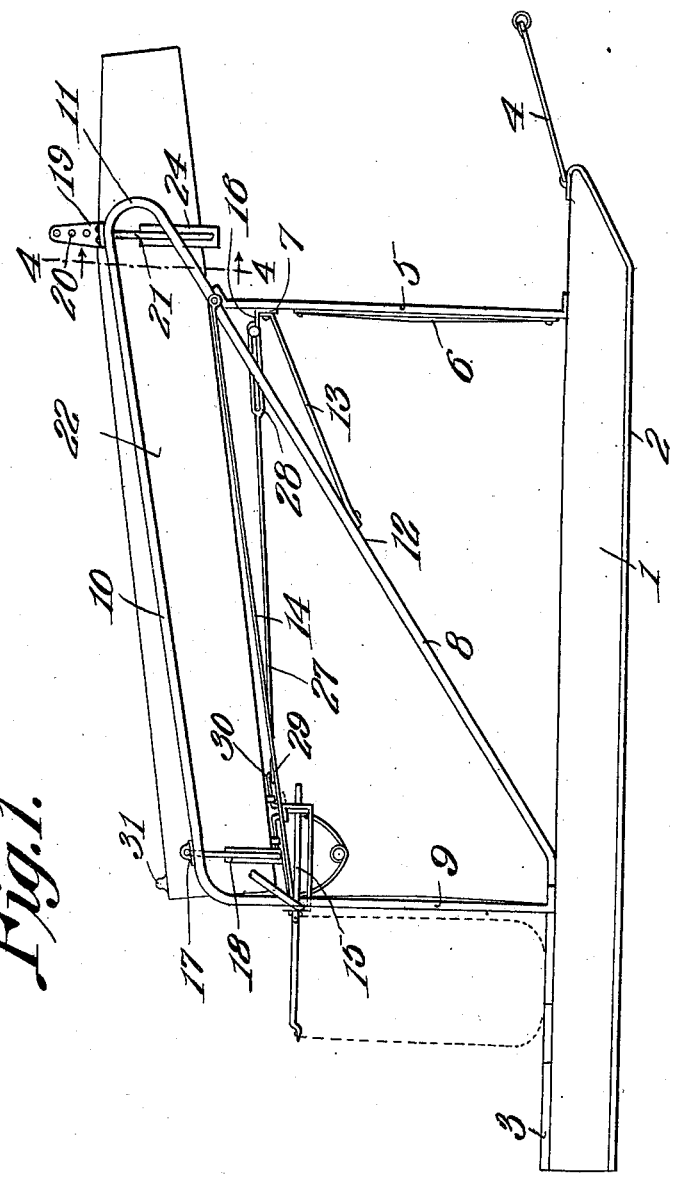

J. THOMPSON.
POTATO SORTER.
APPLICATION FILED NOV. 29, 1910.

996,165.

Patented June 27, 1911.
3 SHEETS—SHEET 1.

Witnesses

James Thompson,
Inventor
by C. A. Snow & Co.
Attorneys

J. THOMPSON.
POTATO SORTER.
APPLICATION FILED NOV. 29, 1910.

996,165.

Patented June 27, 1911.

3 SHEETS—SHEET 2.

Fig. 2.

Witnesses

James Thompson,
Inventor by C. A. Snow & Co.
Attorneys

J. THOMPSON.
POTATO SORTER.
APPLICATION FILED NOV. 29, 1910.
996,165.
Patented June 27, 1911.
3 SHEETS—SHEET 3.
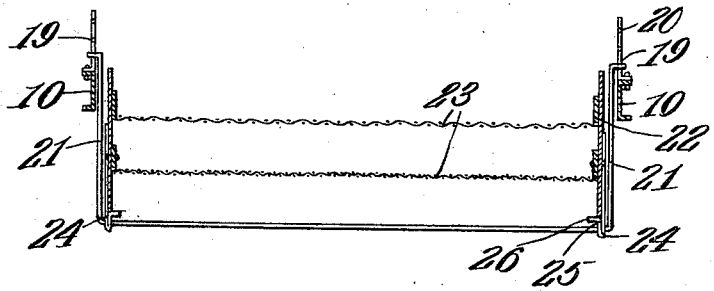
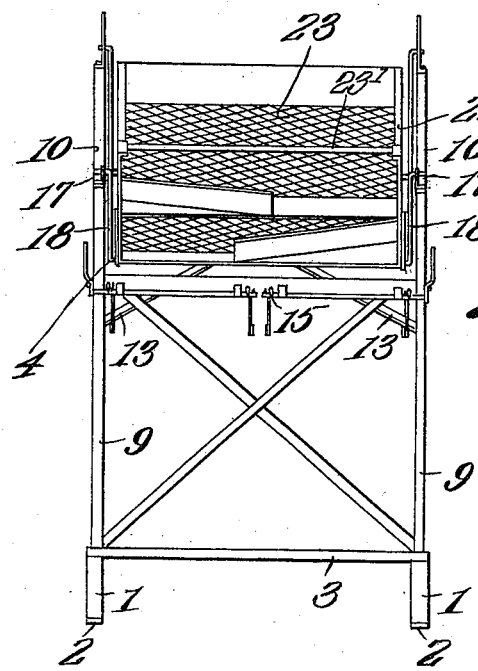
Witnesses
James Thompson,
Inventor
by C. A. Snow & Co.
Attorneys

UNITED STATES PATENT OFFICE.

JAMES THOMPSON, OF GREELEY, COLORADO.

POTATO-SORTER.

996,165.  Specification of Letters Patent.  Patented June 27, 1911.

Application filed November 29, 1910. Serial No. 594,746.

*To all whom it may concern:*

Be it known that I, JAMES THOMPSON, a citizen of the United States, residing at Greeley, in the county of Weld and State of Colorado, have invented a new and useful Potato-Sorter, of which the following is a specification.

This invention has relation to potato sorters and consists in the novel construction and arrangement of its parts as hereinafter shown and described.

The object of the invention is to provide a simple and an effective structure adapted to separate the potatoes into different grades or sizes and with this object in view the sorter includes a base or foundation in the form of runners upon which is mounted a framework. A trunk is mounted for reciprocatory movement upon the framework and means for jarring the said trunk at the ends of its reciprocatory movement is provided, one end of said means being connected with the trunk and the other end being adapted to engage fixed parts mounted upon the framework.

In the accompanying drawings, Figure 1 is a side elevation of the potato sorter. Fig. 2 is a top plan view of the same. Fig. 3 is an end view of the same. Fig. 4 is a transverse sectional view of part of the sorter cut on the line 4—4 of Fig. 1.

The potato sorter consists of runners 1 which are shod with metallic strips 2 in a usual manner and upon the rear ends of which is mounted a platform 3. Draft links 4 are connected with the forward ends of the said runners 1. A framework is mounted upon the said runners and the said framework includes uprights 5 which are braced together by means of cross strips 6. A cross bar 7 connects the upper portion of the said uprights together. Side pieces 8 are secured at their ends to the upper edge portions of the runners 1 in the vicinity of the platform 3 and extend vertically from the said runners as at 9, thence are inclined as at 10 in the direction of the forward ends of the runners 1, thence are curved downwardly as at 11, thence as at 12 are inclined downwardly toward the runners 1 and the points of attachment of the vertically disposed portions 9 with the said runners are attached to the upper edge portions of the runners in a manner as indicated in Fig. 1 of the drawings. The portions 9 of the said side pieces 8 are also connected with the upper ends of the uprights 5 and the braces 13 extend from the cross bar 7 and are connected with the intermediate portions of the parts of the said side pieces 8. Braces 13 are connected at one end with the upper end parts of the portions 9 of the side pieces 8 and at their other ends are connected with the portions 12 of the side pieces 8 in the vicinity of the upper ends of the uprights 5 as shown in Fig. 1 of the drawing. Bag supporting devices 15 are mounted upon the upright portions 9 of the side pieces 8 and the braces 14 and are located above the platform 3. As the said devices specifically form no part of the present invention further description of the same is not herein given.

A bracket 16 is supported upon the intermediate portion of the cross bar 7 and has a portion received by the loop of a jarring rod which will be explained hereinafter. Bearings 17 are mounted upon the upper edges of the lower portions of the parts 10 of the side pieces 8 and the ends of a crank shaft 18 are journaled in the said bearings. Bearing strips 19 are mounted upon the upper end portions of the parts 10 of the side pieces 8 and each strip 19 is provided with a series of perforations 20 adapted to receive the ends of a crank shaft 21. The said shaft 21 is preferably made from spring material or metal and by forcing the end portions of the said crank shaft toward each other they may be disengaged from any particular perforations 20 in the strip 19 and engaged with others by permitting the said ends to spring away from each other. A trunk 22 is journaled upon the intermediate portions of the crank shafts 18 and 21 and is provided with the usual sorting screens 23. The bearings for the trunk 22 upon the intermediate portions of the said shafts consist of strips 24 which are bolted upon the outer surfaces of the sides of the said trunk 22 and extended down below the lower edges of the said sides. The strips 24 are then bent back upon themselves as at 25 and are then bent inwardly as at 26, the said portions 26 fitting snugly against the lower edges of the sides of the trunk 22. The lower portions of the strips 24 and the bent back portions 25 thereof are perforated and it is through the said perforations that the intermediate portions of the crank shafts 18 and 21 pass.

A jarring rod 27 is provided at one end with a loop 28 which slidably receives the intermediate portion of the bracket 16 and the said jarring rod is provided at its other end with an eye 29 which receives a hook 30 mounted upon the lower end portion of the trunk 22. A grip bar 23' is located at the upper edges of the sides of the lower end portion of the trunk 22, as indicated in Fig. 1 of the drawing.

By this arrangement it will be seen that the trunk 22 may be fixed at a desired angle with relation to a horizontal by adjusting the crank shaft 21 in the perforations 20 of the strips 19. When potatoes are poured upon the screen 23 an operator grasps the grip bar 31 and reciprocates the trunk 22 back and forth. As the ends of the loop 28 of the jarring rod 27 come in contact with the intermediate portion of the bracket 16 the said trunk 22 is suddenly brought to a stop in its reciprocatory movement and the potatoes are subjected to a jarring action which causes the said potatoes to more readily descend along the screen 23 and the operation of separating the potatoes is thereby facilitated. By reason of the peculiar formation of the strips 24 and their manner of location upon the sides of the trunk 22 this jarring action to which the trunk is subjected does not wear the said trunk or permit the parts of the sorter to become loose and consequently inaccurate in their operation.

Having described the invention what I claim as new and desire to secure by Letters Patent is:

A potato sorter comprising a frame, a sorting trunk mounted for reciprocatory movement upon the frame and a jarring rod connected at one end with the trunk and at its other end slidably engaging the frame and adapted to bring the trunk to a sudden state of rest at the end of each reciprocation.

In testimony that I claim the foregoing as my own, I have hereto affixed my signature in the presence of two witnesses.

JAMES THOMPSON.

Witnesses:
HENRY CANDLIN,
ALICE LEONARD.

Copies of this patent may be obtained for five cents each, by addressing the "Commissioner of Patents, Washington, D. C."